Dec. 15, 1936.　　　　O. A. BOCH　　　　2,063,906

LOCATION FINDER

Filed May 10, 1935　　　5 Sheets-Sheet 2

INVENTOR
OSCAR A. BOCH
BY Gustav Drews
ATTORNEY

Dec. 15, 1936.  O. A. BOCH  2,063,906

LOCATION FINDER

Filed May 10, 1935   5 Sheets-Sheet 3

INVENTOR
OSCAR A. BOCH
BY
ATTORNEY

Dec. 15, 1936.  O. A. BOCH  2,063,906
LOCATION FINDER
Filed May 10, 1935    5 Sheets-Sheet 4

INVENTOR
OSCAR A. BOCH
BY Gustav Crews
ATTORNEY

Dec. 15, 1936.　　　　O. A. BOCH　　　　2,063,906
LOCATION FINDER
Filed May 10, 1935　　　5 Sheets-Sheet 5

INVENTOR
OSCAR A. BOCH
BY Gustav Drews
ATTORNEY

Patented Dec. 15, 1936

2,063,906

UNITED STATES PATENT OFFICE 2,063,906

LOCATION FINDER

Oscar A. Boch, Brooklyn, N. Y., assignor of one-half to William V. Hagendorn, Kew Gardens, N. Y.

Application May 10, 1935, Serial No. 20,729

16 Claims. (Cl. 250—11)

This invention relates to location finders in general and more particularly to devices which will indicate to the attendant the location of a conveyance, such as an airplane, vessel, automobile or the like.

Among the objects of the present invention, it is aimed to provide a device for locating not only the place relative to the earth over which an airplane may be positioned or the place on the earth where a vessel, automobile or other conveyance may be positioned but in addition also chart the path of such conveyance during movement of the same so that the navigator, observer, attendant or the like may at any moment determine the location during movement of the conveyance.

It is still another object of the present invention to provide an improved location finder co-operating with a plurality of sources of radio frequency or the like disposed at a plurality of predetermined positions to indicate to the observer on the conveyance such as an airplane, vessel, automobile or the like the position or location of the conveyance at any particular moment during movement or when at rest.

It is still a further object of the present invention to provide an improved location finder for use on a conveyance such as an airplane, vessel, automobile or the like cooperating with the radio impulses having different frequencies of three predetermined broadcasting stations whereby indicators will be moved relative to a map to indicate to the observer not only the location of the conveyance at any particular moment but also chart the path of the conveyance during movement.

These and other features, capabilities and advantages of the invention will appear from the detail description of one specific embodiment thereof illustrated in the accompanying drawings in which—

In the embodiment illustrated, a map 1 is used on which a portion of the apparatus is positioned relative to three broadcasting stations of different frequencies so that the pins 2, 3 and 4 are pierced into the map 1 in alinement with the three broadcasting stations selected. The pins 2 and 4 correspond to the centers of rotation of the needles of the meters 5 and 6 and the pin 3 corresponds with the center of rotation of the axis 7.

In the present instance, the broadcasting stations at Cleveland, Washington and New York are selected of different radio frequencies and the pins 2, 3 and 4 pierced into the locations of these cities on the map 1. Secured to the meters 5 and 6 are the pointers or indicating arms 8 and 9 which will cross one another according to the present invention at the point P in alinement with the location on the map 1 where the conveyance is located.

Figures 1, 1A:
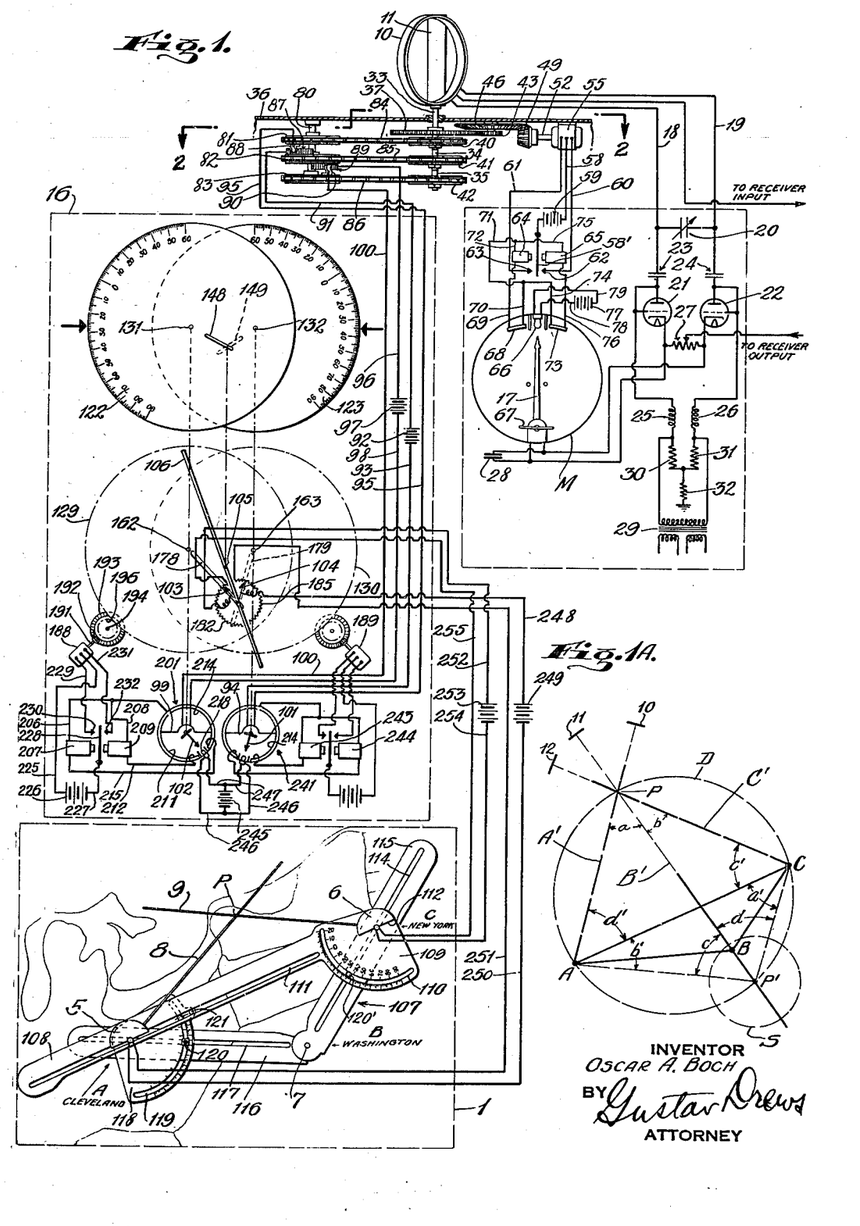
Figure 1 illustrates more or less diagrammatically the several elements of the location finder together with a wiring diagram showing the electrical connections of the several parts.
Fig. 1A shows charts illustrative of the geometrical problem upon which the invention is based.
Figure 2:
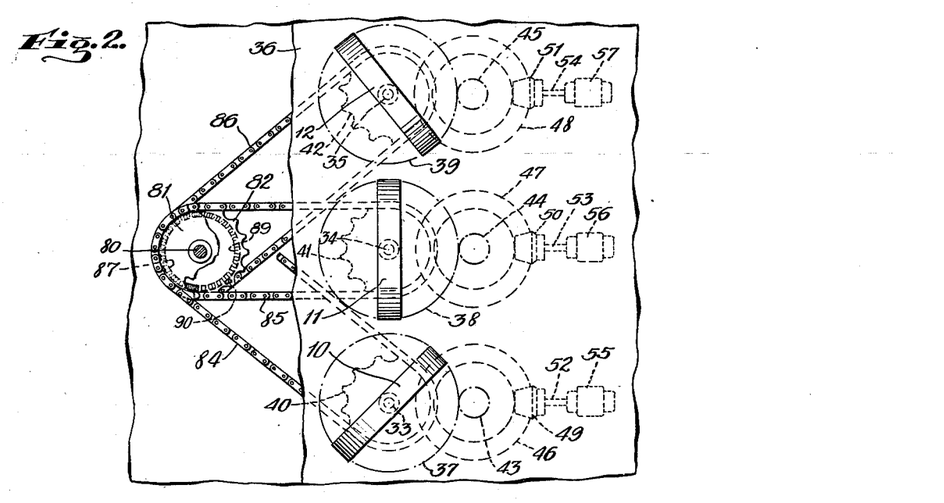
Fig. 2 is a section on the line 2—2 of Fig. 1.
Figure 3:
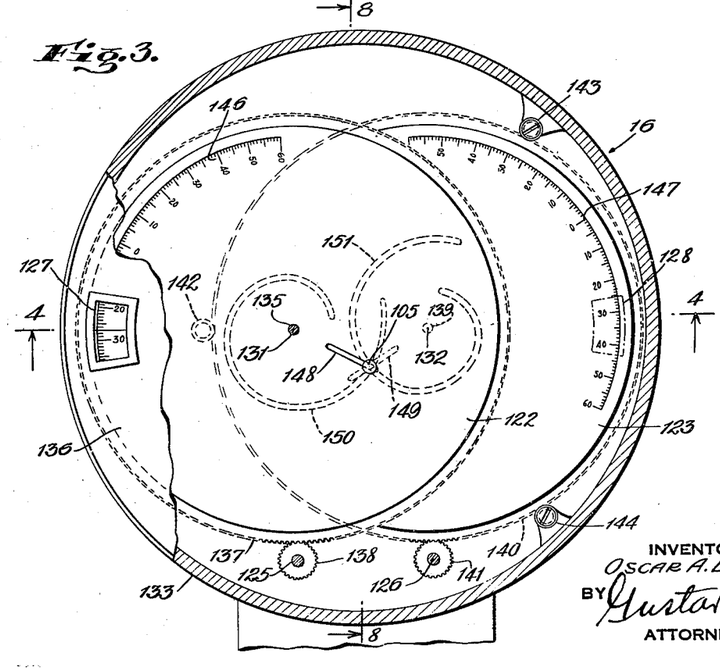
Fig. 3 is a section on the line 3—3 of Fig. 4.

Since the geometric problem illustrated in Fig. 1A made it possible to produce the present invention, it is believed desirable to explain this geometric problem and its relation to the present invention before proceeding to a detailed description of the apparatus used.

Advantage is taken of the loop antenna radio direction finder by means of which a loop aerial will be automatically moved to face the source of a radio impulse at right angles to an imaginary line drawn from the source to the plane of the loop aerial.

In the present invention, three such automatically actuated loop aerials are used and are diagrammatically shown in Fig. 1A as 10, 11 and 12. If for instance the points A, B and C are selected as the locations of the sources of radio impulses and the aerials 10, 11 and 12 are tuned to the frequencies of the stations A, B and C respectively according to this loop antenna radio finder they will position themselves as indicated in Fig. 1A to face the stations A, B and C.

If lines are drawn at right angles to the faces of the loop aerials 10, 11 and 12 toward their respective stations A, B, and C and lines connecting the stations A, B and C relative to the unknown location form a closed triangle outside of the unknown location then the lines A', B' and C' should intersect at a point coinciding with the unknown location, it is then only necessary to devise apparatus whereby two indicating arms, such for instance as the arms 8 and 9 of Fig. 1, will be actuated to correspond with the imaginary lines A' and C'.

In the present instance, the lines A' and C' from their respective aerials 10 and 12 to their respective stations A and C intersect at a point P. It is of course also known that a circle can be described through any three points which we will assume in the present instance to be the circle D drawn through the points A, P and C. The line B' intersecting the angle formed at the point P by the lines A' and C' can of course be extended to intersect the circle D at some point P'. If the lines CP' and AP' are now drawn, it is of course apparent that the angle $a$ formed between the lines A' and B' within the circle D is equal to the angle $a'$ formed at the point C between the lines AC and CP' since they intercept the same arc AP'. It will also appear that the angle $b$ formed at the point P by the lines B' and C' will equal the angle $b'$ formed at the point A between the lines CA and AP' since they intercept the same arc CP'.

From the foregoing, it will also appear that the angle $c$ formed at the point P' between the lines AP' and BP' will equal the angle $c'$ formed at the point C between the lines AC and PC because they intercept the same arc AP and that the angle $d$ formed at the point P' between the lines BP' and CP' will equal the angle $d'$ formed at the point A between the lines PA and CA since they intercept the same arc PC.

From the foregoing, it will then appear that if the angles $c$ and $d$ can be measured and translated into mechanical forces that arms extending from the points A and C in the direction of the point P can be controlled to form the angles $c'$ and $d'$ to intersect at the point P.

The apparatus now to be described will show how these angles $c$ and $d$ are determined and measured and so translated into mechanical forces in turn to actuate the arms 8 and 9 of Fig. 1 to intersect at the point P.

The apparatus used in the present invention consists essentially in a radio control having three radio receiving units, one for each of the loop aerials 10, 11 and 12, for measuring the angles formed between bearings drawn from the unknown point of location to the known points of location of the sources of radio impulses received; the housing 16 in which is mounted the mechanism for translating the angles so measured into mechanical forces and the map 1 and associated instrument supporting the indicating arms 8 and 9 controlled by the forces so translated by the mechanism in the housing 16.

The radio control in the present instance consists of three radio receiving units, each connected with one of the loop aerials 10, 11 and 12 and each in turn connected with a meter, such as the meter M having an indicating arm or needle 17.

The wiring between each loop aerial and its meter M is substantially identical one to the other and therefore only one wiring diagram is illustrated, the wiring diagram for the aerial 10, it being connected by the conductors 18 and 19 to the condenser 20 which is operative to tune in the aerial 10, the ends of which in turn are connected to the rectifier tubes 21 and 22 through the equal condensers 23 and 24 respectively.

An alternating voltage of a frequency readily passed by the audio amplifier (not shown) of the radio receiving unit is applied in opposite phase through the radio frequency inductors 25 and 26 to the plates of the rectifier tubes 21 and 22 respectively. The cathodes of the rectifier tubes 21 and 22 are connected one to each end of the resistor 27, the adjustable center tap of which passes through the audio output transformer 29 of the radio receiver to ground. The meter M is connected across this resistor 27. Condenser 28 is a high capacity, low voltage electrolytic condenser which damps the meter M. An audio oscillator including the oscillation transfer 29 supplies voltage to the rectifier tubes 21 and 22 across the voltage divider formed by the resistors 30 and 31. The resistors 30 and 31 of the voltage divider are substantially equal resistors accurately matched to about one-half of one per cent to insure equal voltages of opposite phase for the rectifier tubes 21 and 22. The resistor 32 may be added to the circuit to reduce the effect of any changes in the resistance tubes 20 and 22. Greater sensitivity however will result if the resistor is omitted.

From the foregoing, it will thus appear that when a positive voltage is applied to the plate of the rectifier tube 21 by the audio oscillator identified by the transformer 29, a negative voltage is applied to the plate of the rectifier tube 22, whereupon the rectifier tube 21 will draw current and will have low resistance to ground and the rectifier tube 22 will be cut off with high resistance to ground. When the phase reverses the rectifier tube 21 will be cut off and the rectifier tube 22 will draw current and the grounding point of the loop antenna 10 will be reversed about its center point, thereby the field pattern of the loop antenna will be rapidly reversed and dissymmetry is obtained by placing the ends of the loop antenna alternately at ground.

The currents of the rectifier tubes 21 and 22 produced by the voltage of the audio oscillator identified by the transformer 29 pass through the meter M in opposite directions when the voltage of the audio oscillator identified by the transformer 29 is applied equally to these rectifier tubes 21 and 22. The currents will be equal and the meter will read zero indicating that the aerial 10 is trained at right angles to the source of the radio impulse. Remembering that when the rectifier tube 21 passes current, one loop antenna field pattern will be produced and current passes through the meter M in one direction and when the rectifier tube 22 passes current, another field pattern will be produced and current passes through the meter M in the other direction, the effect of an incoming radio wave will be obvious. When the loop antenna is grounded at one end, the signal at the output of the radio receiver will be proportional to the field pattern for that condition and the current through the meter M will be proportional to the voltage of the audio oscillator and the output voltage.

When the loop antenna is grounded at the other end similar conditions will hold but there will be a reversal of current in the meter M. Since the currents through the meter M due to the audio oscillator will be equal and opposite currents deflecting the needle 17 right or left are directly proportional to the difference between the output voltages due to each field pattern.

The mechanism now to be described has been devised automatically to set and maintain each aerial at right angles to the direction of the radio impulse. The aerials 10, 11 and 12 are mounted upon shafts 33, 34 and 35 respectively journaled in the support 36. The shafts 33, 34 and 35 have fixed thereto the pinions 37, 38 and 39 respectively and have also fixed thereto the sprocket wheels 40, 41 and 42 respectively, sprocket wheel 40 being in the present instance disposed at the highest level as indicated in Fig. 1, sprocket wheel 41 disposed at the next lower level and sprocket wheel 42 at the lowest level.

The pinions 37, 38 and 39 mesh with the spur gears 43, 44 and 45 fixed on the shafts journaled in the support 36 on which in turn are fixed the beveled gears 46, 47 and 48 respectively in mesh with the beveled gears 49, 50 and 51 on the shafts 52, 53 and 54 of the motors 55, 56 and 57 respectively.

Each of the motors 55, 56 and 57 in turn are connected to the meter M of the radio receiver unit connected to its associated loop aerial. The operative connection between the meter M of the aerial 10 and the motor 55 typical of all of such connections is illustrated and will now be described.

The motor 55 is a reversible motor connected by the conductor 58 with a source of current supply 59, connected by the conductor 60 with one of its windings for turning the motor in one direction and connected by the conductor 61 with the other of its windings for turning the motor in the reverse direction. The conductors 60 and 61 terminate in contacts 62 and 63 respectively, each of which to the exclusion of the other is adapted to be engaged by the movable contact 58' connected to the source of current supply 59.

The movable contact 58' is in turn controlled by the electromagnets 64 and 65 to be actuated into engagement with either one or the other of said contacts 62 or 63. Either of the electromagnets 64 or 65 to the exclusion of the other may be energized according to the deflection from zero position of the needle 17.

Assume for instance that when the plane of the loop antenna 10 rotates to the left of a true bearing, the needle 17 will be deflected to the left and that, when the loop rotates to the right of a true bearing, the needle 17 will be deflected to the right.

Should the needle be deflected to the left, the light rays from the lamp 66 will be free to pass to the reflector 67 in turn to be directed onto a light sensitive body, such as the selenium cell 68 whereby a current will be established in the conductors connecting the selenium cell 68 with the magnet 64 in turn to energize the same and attract the movable contact 58' toward it into engagement with the terminal contact of the conductor 61 thereby to establish the current for the motor 55 and cause it to turn in one direction to return the loop aerial 10 to a direction at right angles to its radio impulse. One terminal of the selenium cell 68 is connected by the conductor 69 with one terminal of the electric magnet 64 while the other terminal is connected by the conductors 70, 71 and 72 with the other terminal of the electric magnet 64.

If, on the other hand, the needle 17 is deflected to the right, the light rays from the lamp 66 will be deflected by the deflector 67 onto the selenium cell 73 to energize the electric magnet 65 in turn to attract the movable contact 58' into engagement with the terminal contact of the conductor 60 thereby to establish the circuit for the motor 55 through the conductor 60 to actuate the motor in the reverse direction to that effected when the movable contact 58' engages the terminal contact of the conductor 61.

One terminal of the selenium cell 73 is connected by the conductors 74, 71 and 75 with one terminal of the electric magnet 65 and the other terminal of the selenium cell 73 is connected by the conductor 76 with the other terminal of the electric magnet 65. The terminals of the lamp 66 are in turn connected to a suitable source of electric energy 77 by the conductors 78 and 79 respectively.

From the foregoing, it will of course appear that when the motor 55 has actuated the aerial 10 so that it will train its face at right angles to the source of the radio impulse, the voltage applied to the rectifier tubes 21 and 22 will be equal and the needle 17 returned to its zero position where the light from the lamp 66 will be reflected back upon itself by the reflector 67 and none of the light rays directed onto the selenium cells 68 and 73 thereby in turn to deenergize the electric magnets 64 or 65 to release the movable contact 58' and interrupt the current of the motor 55.

The mechanism now to be described will show how the angles a and b of Fig. 1A formed between lines extending at right angles to the loop aerials 10, 11 and 12 from their respective sources of radio impulses may be translated into corresponding degrees of electrical energy.

For this purpose, there is fixed the shaft 80 to suspend from the support 36 on which in turn are journaled the three sprocket wheels 81, 82 and 83, the sprocket wheel 81 being connected by the sprocket chain 84 with the sprocket wheel 40, sprocket wheel 82 by the sprocket chain 85 with the sprocket wheel 41 and sprocket wheel 83 by the sprocket chain 86 with the sprocket wheel 42.

The sprocket wheel 82 has an upwardly extending semi-annular resistance 87 to cooperate with the brush 88 extending down from the sprocket wheel 81. The sprocket 82 also has a downwardly extending semi-annular resistance 89 to cooperate with the contact 90 extending upwardly from the sprocket wheel 83. The resistances 87 and 89 preferably complement one another to form a complete annulus.

One end of the resistance 87 is connected by the conductor 91 with the source of electric current 92 and in turn by the conductor 93 with one terminal of the meter 94.

The brush 88 cooperating with the resistance 87 is in turn connected by the conductor 95 with the other terminal of the meter 94. One terminal of the resistance 89 is in turn connected by the conductor 96 with the source of electric current 97 which is in turn connected by the conductor 98 with one terminal of the meter 99. The brush 90 cooperating with the resistance 89 is in turn connected by the conductor 100 with the other terminal of the meter 99.

The sprockets 81, 82 and 83 are arranged on the shaft 80 in such a manner that in the present instance the contact arm 88 is on a diameter of the sprocket 81 which is parallel to the plane of the loop aerial 10; that the terminals of the resistances 87 and 89 are on a diameter of the sprocket 82 which is parallel to the plane of the loop aerial 11; and that the contact arm 90 is on a diameter of the sprocket 83 which is parallel to the plane of the loop aerial 12.

Thereupon the angle formed by the diameters bearing the contact arm 88 and the terminal of the resistance 87 will be equal to the angle formed by the planes of the loop aerials 10 and 11, and the amount of electrical resistance in the resistance 87 included between the terminal of the resistance 87 and the contact 88 will be proportional to the whole amount of electrical resistance possible in the entire arc of one hundred and eighty degrees of the resistance 87 as the angle between the planes of the loop aerials 10 and 11 will be proportional to the one hundred and eighty degree arc possible between said planes.

Furthermore, the angle formed by the diameters bearing the contact arm 90 and the terminal of the resistance 89 will be equal to the angle formed by the planes of the loop aerials 12 and 11, and the amount of electrical resistance in the resistance 89 included between the terminal of the resistance 89 and the contact 90 will be proportional to the whole amount of electrical resistance possible in the entire arc of one hundred and eighty degrees of the resistance 89 as the angle between the planes of the loop aerials 11 and 12 will be proportional to the one hundred and eighty degree arc possible between said planes.

Given an arc of one hundred and eighty degrees each for the resistances 87 and 89 and assuming that the resistances are so wound that successive areas correspond in resistance to corresponding increments of an one hundred and eightly degree meter arc, it will of course be obvious that the needles 101 and 102 will intercept arcs on the meters 94 and 99 to measure degrees corresponding to the angles $a'$ and $b'$ equal to the angles formed between the imaginary lines drawn at right angles to the faces of the aerials 10, 11 and 12 from their respective sources of radio impulses corresponding to the angles $a$ and $b$, see Fig. 1A.

The apparatus now to be described is used to translate the electrical energy of the meters 94 and 99 stepping off the angles $a'$ and $b'$, Fig. 1A, corresponding to the positions of their needles 101 and 102 into mechanical forces stepping off angles $d$ and $c$, Fig. 1A, to determine the positions of the contacts 103 and 104 relative to the resistance coils 182 and 185 respectively. Since the contact 103 is positioned in a line that is radial to the discs mounted to rotate about the axial center 131 corresponding to the station A and the contact 104 is positioned in a line that is radial to the discs mounted to rotate about the axial center 132 corresponding to the station C, it is of course obvious by reference to the diagram of Fig. 1A that the axial centers 131 and 132 may be assumed to correspond in position to the stations or sources of radio impulses A and C respectively and that the point of intersection of the lines drawn through contact 103 and center 131 with the line drawn through contact 104 and center 132 will correspond to the point P' in the circle determined by the points A, C and the point corresponding to the unknown location point P, where the line corresponding to the line drawn from the aerial 11 through the station B will intercept such circle, and that the arcs on the resistances 182 and 185 intercepted by the contacts 103 and 104 will correspond to the angles $c$ and $d$.

To solve this part of the problem, it is therefore only necessary to determine the position of the rod corresponding to the line drawn through the station B and the point P'. For this reason, initially it is only necessary to manually set an abutment or point 105 at a position to correspond to the position of the station B relative to the stations A and C.

This abutment 105 in the present instance is fixed to the rod 106 corresponding in position to the line drawn from the aerial 11 through the point P'. The position of the pin 105 relative to the centers 131 and 132 will be determined by the angles formed by the lines connecting these several points on a map on which the positions relative to one another of the stations A, B and C are accurately determined.

The map 1 in the present instance shows a part of the eastern portion of the United States in which the cities of Cleveland, Washington and New York are located and for the purpose of the description, the location of Cleveland is designated as A station, the location of Washington as B station and the location of New York as C station.

On this map 1 a triangular apparatus 107 is manually set with the pins 2, 3 and 4 piercing the map at the stations A, B and C.

The triangular apparatus 107 consists essentially of an arm 108 having an enlargement 109 at one end provided with an arcuate slot 110 which corresponds to slightly more than a right angle and is calibrated in the present instance from twenty below zero to ninety above zero. Longitudinally of the arm 108, there is also provided a longitudinally extending slot 111. In the present instance, the calibration zero alines with the slot 111. In the enlargement 109 and in alinement with the axial center of the slot 110, there is secured the pin 4. This pin 4 being fixed in alinement with the axial center of the slot 110 will of course also be in alinement with the longitudinally extending slot 111.

On the enlargement 109, there is mounted the meter 6 with its base 112 also in alinement with the center of the longitudinally extending slot 111 and its arcuate portion a needle 9 extending away from the axis 7.

Figure 12:
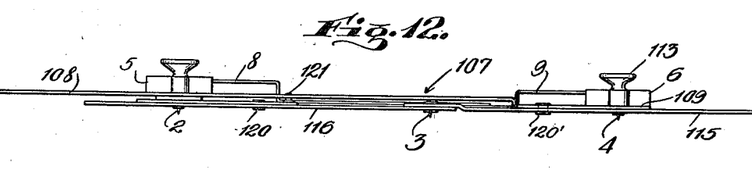
Fig. 12 is an enlarged side elevation of the part of the apparatus which is positioned on a map shown in the lower part of Fig. 1.
Figure 13:
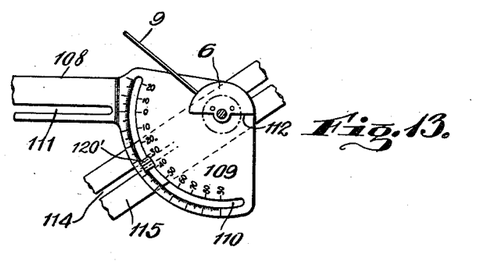
Fig. 13 is an enlarged fragmental view of a part of the device shown in Fig. 12.

Preferably as shown in Fig. 12 an enlarged head 113 is mounted to extend above the meter 6 and substantially in alinement with the pin 4 to facilitate locating the pin 4 at the station desired.

In alinement with the pin 4, there is a pivot pin extending through the slot 114 of the arm 115, the slot 114 extending longitudinally of the arm 115. This arm 115 in the present instance is disposed below the enlargement 109 and has a pivot pin at its axis 7 to pivotally connect it to the arm 116 having a longitudinally extending slot 117 through which extends a pivot pin in alinement with the pivot pin 2. Extending through the slot 114 of the arm 107 and the slot 110 of the enlargement 109 where the slots 114 and 110 cross one another, there is provided the pin 120' which acts as an indicator to register with the calibration on the enlargement 109 corresponding to the angle formed by the arms 115 and 108.

The pivot pin in alinement with the pin 2 is preferably fixed to the arcuate scale 118 having an arcuate slot 119 calibrated similarly to the enlargement 109 preferably from twenty to zero and from zero to ninety to embrace an angle of more than ninety degrees.

Extending through the arcuate slot 119 and the longitudinally extending slot 117, there is provided the pin 120 which is slidably mounted in both slots. Extending upwardly from the scale 118 there is also provided a pin 121 fixed to the scale 118 but slidable in the longitudinally extending slot 111. The pivot pin in alinement with the pin 2 is slidably mounted not only in the longitudinally extending slot 117 but also in the longitudinally extending slot 111. The pin 120 in turn acts as an indicator to register with the calibration on the scale 118 corresponding to the angle formed by the arms 116 and 108.

The meter 5 is fixedly secured to the scale 118 so that its base due to the pin 121 will be disposed in alinement with the center of the slot 111 and its arcuate portion and needle 8 will extend away from the axis 7.

Initially after the triangular apparatus 107 has been secured in place with the pins 2, 3 and 4 located at the stations A, B and C, the angle in degrees formed at the points A and C will be read on the scales 109 and 118 and upper discs 122 and 123 manually rotated by the thumb screws 124 in alinement with the shafts 125 and 126 until these two discs show a reading at windows 127 and 128 corresponding to the reading on the scales 118 and 109 respectively whereupon the abutment 105 will be positioned relative to the centers of rotation 131 and 132 of the discs 122 and 123 respectively to correspond to the position of the pins 2, 3 and 4 on the map 1. In other words, the readings on the scales 118 and 109 of the triangular apparatus 107 are relied upon to position the abutment 105 corresponding to the station B relative to the centers of rotation 131 and 132 of the discs 122 and 123 respectively and electrically controlled mechanical means still to be described are relied upon to position the discs 129 and 130 and thereby step off portions of the resistances 182 and 185 corresponding to the angles c and d, see Fig. 1A and which portions of resistances are connected to the meters 6 and 5 to position the arms 9 and 8 respectively to form angles c' and d' respectively and intersect at a point corresponding to the unknown location point P on the map 1.

The apparatus contained in the housing 16 including the discs 122 and 123 which is used to convert the electrically controlled mechanical means for determining the angles c and d, see Fig. 1A, into electrical energy to position the arms 9 and 8 will now be described.

The housing 16 preferably consists of an upper section 133 and a lower section 134. The discs 122 and 123 are mounted in the upper section 133 and the discs 129 and 130 are operatively associated with the lower section. The disc 122 is preferably pivotally connected to a stub shaft 135 extending downwardly from the cover 136 of the housing 16 on which shaft 135 there is also pivotally mounted the gear 137 in mesh with the spur gear 138 on the shaft 125 of the control abutment 124.

The disc 123 mounted to rotate about a different axis than that of the disc 122 is pivotally connected to the pin 139 about which is pivotally mounted the center of the gear 140 which meshes with the spur gear 141 and is maintained in alinement about its center of rotation by the three guide rollers 142, 143 and 144, the guide roller 142 being rotatably mounted upon the extension 145 and the guide rollers 143 and 144 being mounted upon extensions extending out from the cylindrical wall of the section 133, the guide rollers 142, 143 and 144 engaging the outer periphery of the gear 140.

The cover 136 is provided with two windows 127 and 128 preferably at opposite sides of the housing 16 to register with the graduated portions 146 and 147 respectively of the discs 122 and 123 so that when the thumb screws 124 are manipulated to turn the spur gears 138 and 141, they will in turn actuate the gears 137 and 140 by the connection now to be described, in turn to indicate at the windows 127 and 128, the respective angles formed between the centers of rotation 131 and 132 and the pin 105.

The discs 122 and 123 have formed therein the straight slots 148 and 149 respectively through which extends the upper end of the pin 105 where the slots 148 and 149 cross one another, the slots being of course cut relative to one another and to the graduations 146 and 147 so that the angles formed between the lines drawn between the centers of rotation 131 and 132 and the pin 105 at the centers of rotation 131 and 132 will correspond to the degree noted at the windows 127 and 128.

The disc portions of the gears 137 and 140 in turn are provided with spiral shaped slots 150 and 151 respectively with their overlapping points or portions in alinement with the overlapping points of the slots 148 and 149 so as to receive the pin 105, the formation of the slots 150 and 151 being provided in order to reduce the friction to a minimum, the force being applied to the gears 137 and 140 in which the latter slots are contained.

In view of the foregoing it will then appear that when the spur gear 138 is turned in a clockwise direction the gear 137 will be turned oppositely around its center 131 and the radial distance from that center to the pin 105 in the curved slot 150 in the disc 137 will become less and less as the gear 138 is turned more and more. It will also be seen that as the pin 105 moves toward the center 131 it must slide in the straight slot 148 in the disc 122 which will turn the disc 123 in turn to cause the angle formed at the center 132 by the slot 149 with an imaginary line between the centers 131 and 132 to come smaller and be indicated by a reading in degrees through the window 128. Similarly when the spur gear 138 is turned in a counter clockwise direction, the radial distance from the center 131 to the pin 105 in the curved slot 150 will become greater and the pin 105 will slide in the straight slot 148 outwardly from the center 131 and turn the disc 123 in turn to cause the angle formed at the center 132 by the slot 149 with an imaginary line between the centers 131 and 132 to become larger and be indicated by a reading in degrees through the window 128. The reverse functioning of the gears applies when the spur gear 141 is turned. It can easily be seen that a clockwise turning of gear 141 causes the angle reading through the window 127 to become greater while a counter clockwise turning causes the angle reading to be less.

The pin 105 has pivotally connected to it the rod 106 which is restricted to slide between two pairs of fingers, the pair 152 and 153 and the pair 154 and 155 extending upwardly at opposite ends of the annulus 156 to maintain the rod or bar 106 extending diametrically across the center of rotation of the annulus 156.

Figures 4, 5:
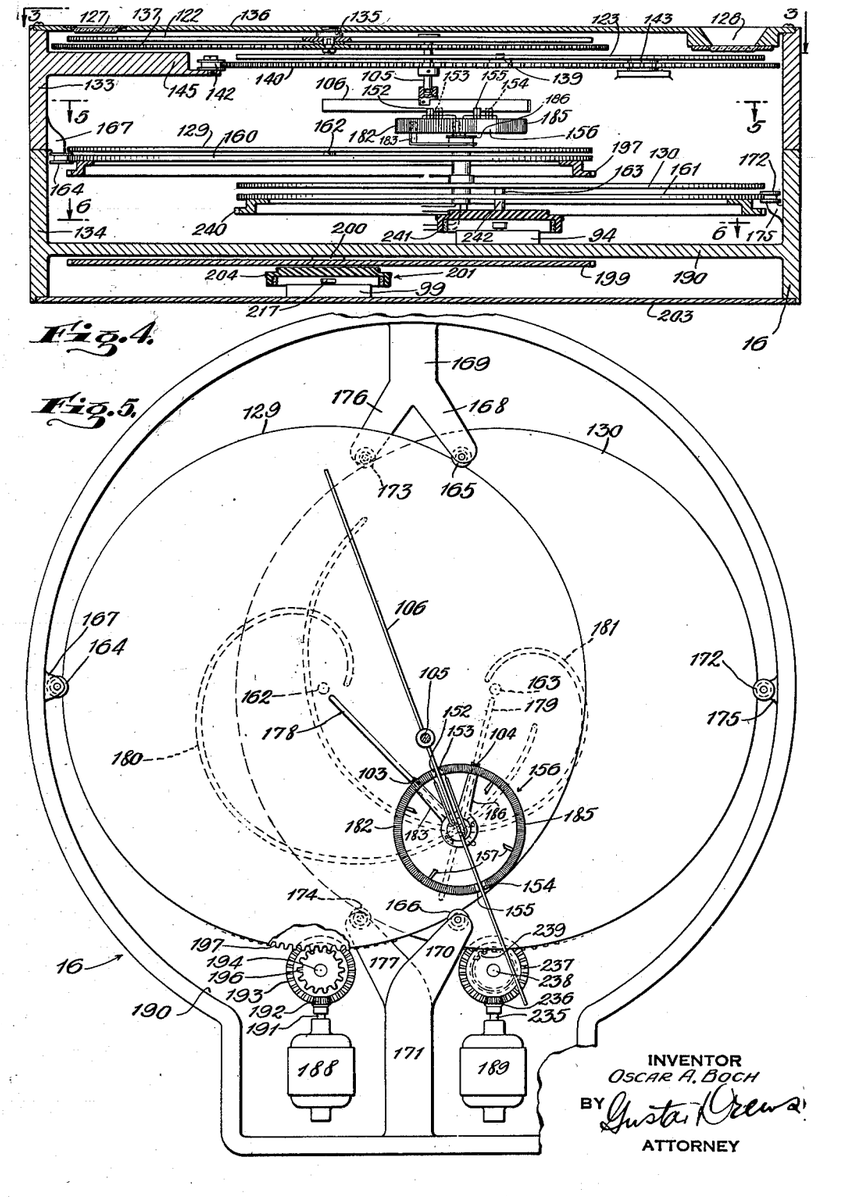
Fig. 4 is a section on the line 4—4 of Fig. 3.
Fig. 5 is a section on the line 5—5 of Fig. 4.
Figure 9:
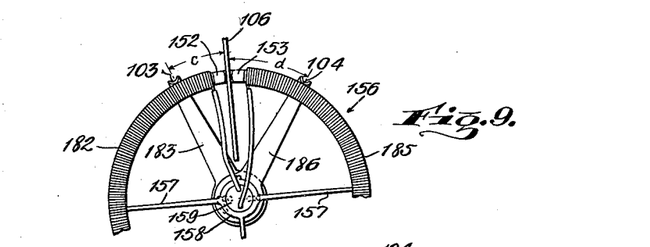
Fig. 9 is a fragmental plan enlarged as compared to Fig. 8 showing one of the resistance devices used.
Figure 10:
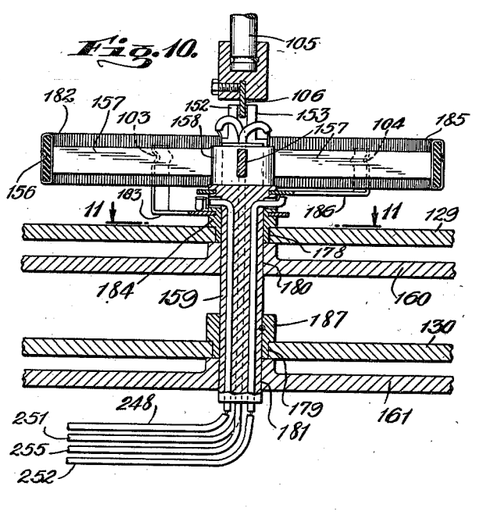
Fig. 10 is a transverse section still further enlarged as compared to Fig. 9 showing the operative relation of the resistance device to its control means.
Figure 11:
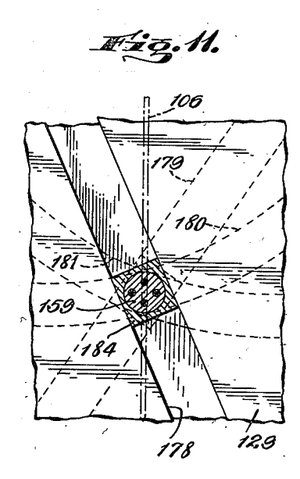
Fig. 11 is a section on the line 11—11 of Fig. 10.

The annulus 156, see Figs. 5, 9 and 10, has two resistance windings, each covering one half of the annulus, separated by the bar 106, and is in turn mounted upon the arm 157 extending outwardly from the hub 158 rotatably on the upper end of a shaft 159 which constitutes the pin which extends through four discs, to wit the discs 129 and 130 and their associated discs 160 and 161 respectively, the disc 160 being mounted to rotate relative to a common pivot pin 162 at the center of rotation of the disc 129, which center of rotation in turn alines with the center of rotation 131 of the disc 122, and the disc 161 being mounted to rotate about a common pivot pin 163 at the center of rotation of the disc 130, which center of rotation in turn alines with the center of rotation 132 of the disc 123.

The discs 129 and 160 are maintained in axial alinement with the disc 122 by the three guide rollers 164, 165 and 166 which engage the periphery of the disc 160, the guide roller 164 being journaled in the extension 167 extending downwardly from the section 133, the roller 165 being journaled in the end of one arm 168 of the bracket 169 and the roller 166 being journaled in the end of one arm 170 of the bracket 171. The discs 130 and 161 are in turn maintained in axial alinement with the disc 123 by the three guide rollers 172, 173 and 174 which engage the periphery of the disc 161, the guide roller 172 being journaled in the extension 175 extending inwardly from the section 134, the roller 173 being journaled in the end of the arm 176 of the bracket 169 and the roller 174 being journaled in the end of the arm 177 of the bracket 171.

The discs 129 and 130 have straight slots 178 and 179 respectively which cross one another to receive the shaft 159 at their overlapping portions, and the discs 160 and 161 have spiral slots 180 and 181 respectively which cross one another at a point in alinement with the point where the slots 178 and 179 overlap, also to receive the shaft 159 whereby the discs 129, 160, 130 and 161 may constantly bear predetermined relations to one another and as a result of which the actuation of the discs 160 and 161 will determine the position of the discs 129 and 130 relative to one another and thereby the position of the pin 159 which positions the annulus 156 which guides the bar 106 and still furthermore the contacts 103 and 104 movable in alinement with the slots 178 and 179 respectively.

The contact 103 is maintained in engagement with the resistance winding 182 being formed at the end of a spring arm 183 extending radially from the sliding block 184, in alinement with the slot 178 in the disc 129 but rotatably mounted on the shaft 159, and the contact 104 is maintained in engagement with the resistance winding 185, being formed at the end of a spring arm 186 extending radially from the upper end of the shaft 159.

The sliding block 184 has plane faces engaging the faces of the slot 178 whereby the contact 103 when once arranged to aline with the slot 178 will be maintained to aline with the same throughout the movement of the shaft 159 relative to the slot 178. In turn the sliding block 187 has plane faces engaging the lateral faces of the slot 179 whereby the contact 104 when once alined with the slot 179 will remain so alined throughout the movement of the shaft 159 relative to the slot 179.

The positions of the discs 129 and 130 relative to one another will depend upon and be in alinement with, the positions of the needles 102 and 101 respectively which control the actuation of the electric motors 188 and 189 respectively mounted on the platform 190 of the housing 16.

Figure 6:
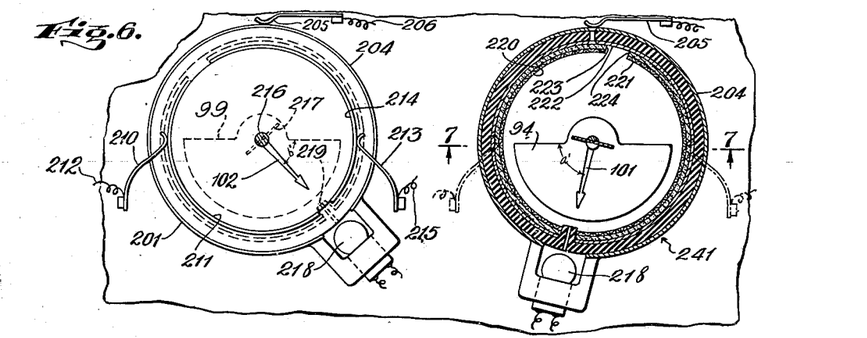
Fig. 6 is a section on the line 6—6 of Fig. 4.
Figure 7:
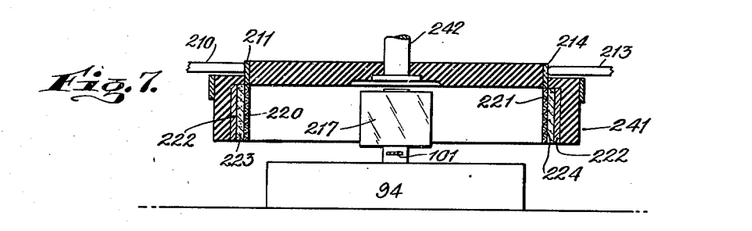
Fig. 7 is a section on the line 7—7 of Fig. 6.
Figure 8:
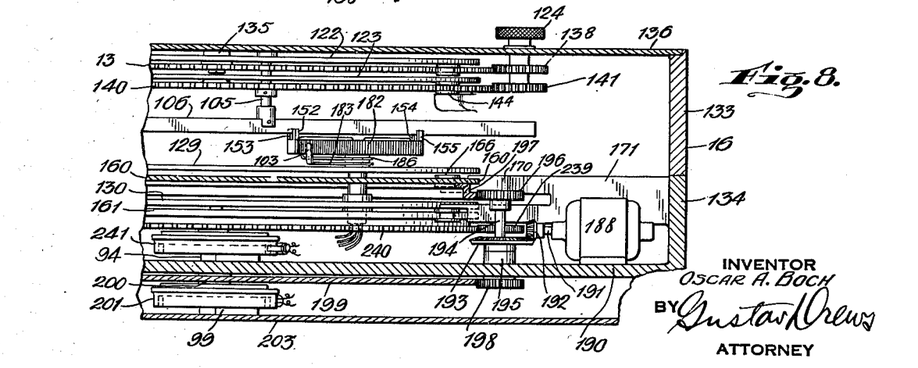
Fig. 8 is a fragmental transverse section taken on the line 8—8 of Fig. 3.

The motor 188 is provided with a shaft 191 to which is fixed the beveled gear 192 in mesh with the beveled gear 193 fixed to the shaft 194 journaled in the bearing 195 and having at its upper end a spur gear 196 in mesh with the toothed extension 197 secured to the lower outer edge of the disc 160. The lower end of the shaft 194 in turn has fixed to it the gear 198 in mesh with the toothed periphery of the gear 199 of the same diameter as the discs 129 and 160 mounted on the shaft 200 journaled in the lower face of the platform 190, on which shaft 200 is mounted the light sensitive housing 201, see Fig. 6, to rotate over and about the meter 99 supported on the base 203 of the housing 16.

The housing 201 preferably has an outer contact ring 204 for the brush 205 which is connected, see Fig. 1, by the conductor 206 with the electromagnet 207 and by the conductor 208 with the electromagnet 209.

The electromagnet 207 in turn is connected to the brush 213 in engagement with the inner ring portion 214 by the conductor 215 and the electromagnet 209 is in turn connected by the brush 210 to the inner ring portion 211 by the conductor 212.

The shaft 216 of the meter 99 may or may not be provided with the needle 102 but is preferably provided with a reflector 217 positioned at zero position to reflect the light rays from the lamp 218 back upon the lamp 218 mounted to direct light rays through the aperture 219 formed between the inner ring portions 211 and 214.

The inner ring portions 211 and 214 are preferably electrically separated from one another and connected with the innermost layers 220 and 221 of the housing 201 constituting layers of wire mesh which are spaced from the contact 222 by the two sections 223 and 224 of a light sensitive substance such as the salt used in selenium cells or the like.

The motor 188 is reversible having a common conductor 225 connected to one terminal of the source of electric current 226, the other terminal of which source 226 is connected by the conductor 227 with the movable contact bar 228 normally maintained spaced from the magnets 207 and 209 in zero position of the needle 102 as shown in Fig. 1.

One of the windings for actuating the motor in one direction is connected by the conductor 229 with the fixed contact 230 thereby engaged by the movable contact 228 when the electromagnet 207 is energized and the other winding for turning the motor 188 in the other direction is connected by the conductor 231 to the fixed contact 232 to be engaged by the movable contact 228 when the electromagnet 209 is energized.

The motor 189 is provided with a shaft 235 to which is fixed the beveled gear 236 in mesh with the beveled gear 237 fixed to the shaft 238 journaled in a bearing, not shown, mounted on the platform 190 and which shaft 235 has at its upper end the spur gear 239 in mesh with the toothed extension 240, secured to the lower outer edge of the disc 161.

On the platform 190, there is mounted the meter 94 and cooperating with it, there is provided the light sensitive device 241 secured to the shaft 242 co-axial with the center of rotation of the disc 161.

The light sensitive device 241 is constructed similar to the light sensitive device 201 and therefore like reference characters will be applied to indicate like parts without further describing the same and since the light sensitive device 241 also cooperates with the meter 94 in the same manner that the device 201 cooperates with the meter 99 to control the motor 189, the wiring between the motor 189 and its electromagnets 243 and 244 will not be described in detail except to state that energization of the electromagnet 243 by the light sensitive device 241 will effect actuation of the motor 189 in one direction and that energization of the electromagnet 244 by the light sensitive device 241 will effect actuation of the motor 189 in the opposite direction.

The lamps 218 of the light sensitive devices 201 and 241 may be connected to the same source of electric current 245, each lamp 218 having one terminal connected by the conductor 246 to one terminal of the source 245 and the other terminal connected by the terminal 247 to the other terminal of the source 245.

From the foregoing, it will thus appear that the angles a and b, Fig. 1A, stepped off by the aerials 10, 11 and 12, after the pin 105 has been manually set will in turn be converted into angles d and c and so be stepped off on the annulus 156, see the circle S, Fig. 1A.

It is now only necessary to set the meters 5 and 6 to measure angles so stepped off, with the needles 8 and 9 operating about the centers A and C of the map 1 to cross one another to determine the unknown location point P. This is effected by connecting the resistances stepped off by the contacts 103 and 104 with the meters 5 and 6 through their respective sources of current. To do this the contact 104 is connected by the conductor 248 with one terminal of the source of electric energy 249 and the other terminal of the source 249 connected by the conductor 250 with one terminal of the meter 5 and the other terminal of the meter 5 connected by the conductor 251 with one terminal of the winding 182, and the contact 103 is connected by the conductor 252 with one terminal of the source of electric energy 253 and the other terminal of the source 253 connected by the conductor 254 with one terminal of the meter 6 and the other terminal of the meter 6 connected by the conductor 255 with one terminal of the winding 185.

It is of course obvious that the various sources of electric energy referred to may all be the same, in other words that one common source of electric energy may supply all of the several working parts with the possible exception of the light sensitive devices without departing from the general spirit of the invention, the sources having been illustrated separately in the interest of clearness.

It is obvious that various changes and modifications may be made to the details of construction without departing from the general spirit of the invention as set forth in the appended claims.

I claim:

1. A location finder including a chart of a predetermined portion of the earth's surface, a support associated with said chart, two indicating arms pivotally mounted on said support with centers of rotation registering with locations on said chart corresponding to two of three known fixed sources of radio impulses, electric rotors operatively connected to said arms, and means tuned to receive the radio impulses of said three known fixed sources of radio impulses and operatively connected to said electric rotors to actuate said arms to cross one another in registration with a point on said chart indicating the unknown location.

2. A location finder including a chart of a predetermined portion of the earth's surface, a support associated with said chart, two electric meters mounted on said support with rotatable shafts registering with locations on said chart corresponding to two of three known fixed sources of radio impulses, an indicating arm secured to each of said shafts, and means tuned to receive the radio impulses of said three known fixed sources of radio impulses and operatively connected to said electric meters to actuate said arms to cross one another in registration with a point on said chart indicating the unknown location.

3. A location finder including a chart of a predetermined portion of the earth's surface, a support associated with said chart, two electric meters mounted on said support with rotatable shafts registering with locations on said chart corresponding to sources of radio impulses, an indicating arm secured to each of said shafts, three loop aerials, means for training said loop aerials at right angles to their respective sources of radio impulses located at three known locations relative to said chart, means for electrically measuring the angles formed between lines drawn at right angles to said loop aerials, electric circuits including resistances, movable contacts and said meters for electrically stepping off angles corresponding to the angles formed by lines drawn from two of said aerials to their respective sources of radio impulses and a line connecting said sources of radio impulses to actuate said arms to cross one another in registration with a point on said chart indicating the unknown location, and mechanical means operatively associated with said electrical measuring means and to said movable contacts to position said movable contacts according to the angles measured by said electrical measuring means.

4. A location finder including a chart of a predetermined portion of the earth's surface, a support associated with said chart, two electric meters mounted on said support with rotatable shafts registering with locations on said chart corresponding to two known sources of radio impulses, an indicating arm secured to each of said shafts, two loop aerials, means for training said two loop aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials, electric circuits including resistances, movable contacts and said meters for electrically stepping off angles corresponding to the angles formed by lines drawn from said two first mentioned loop aerials to their respective sources of radio impulses and a line connecting said latter sources of radio impulses to actuate said arms to cross one another in registration with a point on said chart indicating the unknown location, and mechanical means operatively associated with said electrical measuring means and to said movable contacts to position said movable contacts according to the angles measured by said electrical measuring means.

5. A location finder including a chart of a predetermined portion of the earth's surface, a support associated with said chart, two electric meters mounted on said support with rotatable shafts registering with locations on said chart corresponding to two known sources of radio impulses, an indicating arm secured to each of said shafts, two loop aerials, means for training said two loop aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials including an annulus having two resistance windings operatively associated with one of said loop aerials, movable contacts operatively associated with said other two loop aerials, each engaging one of said resistance windings, and means responsive to said resistances operatively connected to actuate said meters in turn to actuate said arms to cross one another in registration with a point on said chart indicating the unknown location.

6. A location finder including a chart of a predetermined portion of the earth's surface, a support associated with said chart, two electric meters mounted on said support with rotatable shafts registering with locations on said chart corresponding to two known sources of radio impulses, an indicating arm secured to each of said shafts, two loop aerials, means for training said two loop aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials, electric circuits including resistances, movable contacts and said meters for electrically stepping off angles corresponding to the angles formed by lines drawn from said first two mentioned loop aerials to their respective sources of radio impulses and a line connecting said latter sources of radio impulses to actuate said arms to cross one another in registration with a point on said chart indicating the unknown location, and mechanical means operatively associated with said electrical measuring means and to said movable contacts to position said movable contacts according to the angles measured by said electrical measuring means, said means for training said loop aerials at right angles to their respective radio impulses including light sensitive devices responsive to deflections of said loop aerials from positions at right angles to their respective sources of radio impulses to actuate and maintain said loop aerials at right angles to their respective sources of radio impulses.

7. A location finder including a chart of a predetermined portion of the earth's surface, a support associated with said chart, two electric meters mounted on said support with rotatable shafts registering with locations on said chart corresponding to two known sources of radio impulses, an indicating arm secured to each of said shafts, two loop aerials, means for training said two loop aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials, two discs having different centers of rotation corresponding to the positions of said first two known sources of radio impulses, there being slots in said discs, a pin extending through both of said slots, means for actuating said discs in turn to position said pin to form a triangle with said two centers of rotation corresponding to the triangle formed by said three known sources of radio impulses on said chart, a guide bar connected to said pin, and electric circuits including resistances, movable contacts and said meters for electrically stepping off angles corresponding to the angles formed by lines drawn from said two first mentioned loop aerials to their respective sources of radio impulses and a line connecting said latter sources of radio impulses to actuate said arms to cross one another in registration with a point on said chart indicating the unknown location, said guide bar being connected to said resistances to determine their positions relative to said centers of rotation, and mechanical means operatively associated with said electrical measuring means and to said movable contacts to position said movable contacts relative to said centers of rotation and to said resistances to correspond to the angles measured by said electrical measuring means.

8. A location finder including a chart of a predetermined portion of the earth's surface, a support associated with said chart, two electric meters mounted on said support with rotatable shafts registering with locations on said chart corresponding to two known sources of radio impulses, an indicating arm secured to each of said shafts, two loop aerials, means for training said two loop aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials, electric circuits including resistances, movable contacts and said meters for electrically stepping off angles corresponding to the angles formed by lines drawn from said two first mentioned loop aerials to their respective sources of radio impulses and a line connecting said latter sources of radio impulses to actuate said arms to cross one another in registration with a point on said chart indicating the unknown location, two discs having different centers of rotation corresponding to the positions of said first two known sources of radio impulses, there being slots in said discs, a pin extending through both of said slots and the center of rotation of said resistances, means operatively connected to said electrical measuring means for actuating said discs in turn to position said pin to form the apex of a triangle, whose base will form inside angles with its sides equal to the angles formed between lines drawn from said loop aerials to their respective sources of radio impulses in turn to position said contacts on said resistances to step off angles corresponding to the angles formed between lines drawn from the two first mentioned loop aerials to their respective sources of radio impulses and a line connecting said latter sources of radio impulses.

9. A location finder including a chart of a predetermined portion of the earth's surface, a support associated with said chart, two indicating arms pivotally mounted on said support with centers of rotation registering with locations on said chart corresponding to two of three known sources of radio impulses, electric rotors operatively connected to said arms, and means including loop aerials tuned to receive the radio impulses of said three known sources of radio impulses and operatively connected to said electric rotors to actuate said arms to cross one another in registration with a point on said chart indicating the unknown location, said latter means being responsive to deflections of said loop aerials from positions at right angles to their respective sources of radio impulses to actuate and maintain said loop aerials at right angles to their respective sources of radio impulses.

10. A location finder including a chart of a predetermined portion of the earth's surface, a support associated with said chart, two indicating arms pivotally mounted on said support with centers of rotation registering with locations on said chart corresponding to two of three known sources of radio impulses, electric rotors operatively connected to said arms, and means including loop aerials tuned to receive the radio impulses of said three known sources of radio impulses and operatively connected to said electric rotors to actuate said arms to cross one another in registration with a point on said chart indicating the unknown location, said latter means including light sensitive devices responsive to deflections of said loop aerials from positions at right angles to their respective sources of radio impulses to actuate and maintain said loop aerials at right angles to their respective sources of radio impulses.

11. A location finder including a chart of a predetermined portion of the earth's surface, a triangular device having three arms pivotally connected to one another, pins in alinement with the pivotal connecting points of said three arms to pierce said chart at points corresponding to three predetermined sources of radio impulses and thereby anchor said triangular device to said chart, an electric meter mounted at each of two of said pivot points with its center of rotation in alinement with such pivot point, each meter having an indicating arm extending from its center of rotation to cross the arm of the other meter at some point on said chart, and means tuned to receive the radio impulses of said sources of radio impulses and operatively connected to said electric meters to actuate said means to cross one another in registration with a point on said chart indicating the unknown location.

12. A location finder including a chart of a predetermined portion of the earth's surface, a support having two pins, each pin piercing said chart at a point corresponding to two of a greater number of known sources of radio impulses and thereby anchor said support to said chart, two electric meters secured to said support each positioned with its center of rotation in alinement with one of said pins, each meter having an indicating arm movable about its center of rotation and movable to cross the other indicating arm at some point on said chart, and means tuned to receive the radio impulses of more than two known sources of radio impulses including the aforesaid two known sources and operatively connected to said electric meters to actuate said arms to cross one another in registration with a point on said chart indicating the unknown location.

13. A location finder including a chart of a predetermined portion of the earth's surface, a support associated with said chart, two indicating arms pivotally mounted on said support with centers of rotation registering with locations on said chart corresponding to two of three known sources of radio impulses, actuators operatively connected to said arms, and means tuned to receive the radio impulses of said three known sources of radio impulses and operatively connected to said actuators to actuate said arms to cross one another in registration with a point on said chart indicating the unknown location.

14. A location finder including a chart of a predetermined portion of the earth's surface, a support associated with said chart, actuators mounted on said support with rotatable shafts registering with locations on said chart corresponding to two of three known sources of radio impulses, an indicating arm secured to each of said shafts, and means tuned to receive the radio impulses of said three known sources of radio impulses and operatively connected to said actuators to actuate said arms to cross one another in registration with a point on said chart indicating the unknown location.

15. A location finder including a chart of a predetermined portion of the earth's surface, a support associated with said chart, two electric meters mounted on said support with rotatable shafts registering with locations on said chart corresponding to two known sources of radio impulses, an indicating arm secured to each of said shafts, two loop aerials, means for training said two loop aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials, two pairs of discs, the discs of each pair having a common center of rotation but differing from the center of rotation of the other pair, there being a straight slot in one disc of each pair, there being a spiral slot in the other disc of each pair, a pin extending through both sets of slots, means for actuating said discs in turn to position said pin to form a triangle with said two centers of rotation corresponding to the triangle formed by said three known sources of radio impulses on said chart, a guide bar connected to said pin, and electric circuits including resistances, movable contacts and said meters for electrically stepping off angles corresponding to the angles formed by lines drawn from said two first mentioned loop aerials to their respective sources of radio impulses and a line connecting said latter sources of radio impulses to actuate said arms to cross one another in registration with a point on said chart indicating the unknown location, said guide bar being connected to said resistances to determine their positions relative to said centers of rotation, and mechanical means operatively associated with said electrical measuring means and to said movable contacts to position said movable contacts relative to said centers of rotation and to said resistances to correspond to the angles measured by said electrical measuring means.

16. A location finder including a chart of a predetermined portion of the earth's surface, a support associated with said chart, two electric meters mounted on said support with rotatable shafts registering with locations on said chart corresponding to two known courses of radio impulses, an indicating arm secured to each of said shafts, two loop aerials, means for training said two loops aerials at right angles to the two sources of radio impulses corresponding to the locations of said meters on said chart, a third loop aerial, means for training said third loop aerial at right angles to a third known source of radio impulses, means for electrically measuring the angles formed between lines drawn at right angles to said loop aerials, electric circuits including resistances, movable contacts and said meters for electrically stepping off angles corresponding to the angles formed by lines drawn from said two first mentioned loop aerials to their respective sources of radio impulses and a line connecting said latter sources of radio impulses to actuate said arms to cross one another in registration with a point on said chart indicating the unknown location, two pairs of discs, the discs of each pair having a common center of rotation but differing from the center of rotation of the other pair, there being a straight slot in one disc of each pair, there being a spiral slot in the other disc of said pair, a pin extending through both sets of slots and the center of rotation of said resistances, means operatively connected to said electrical measuring means for actuating said discs in turn to position said pin to form the apex of a triangle, whose base will form inside angles with its sides equal to the angles formed between lines drawn from said loop aerials to their respective sources of radio impulses in turn to position said contacts on said resistances to step off angles corresponding to the angles formed between lines drawn from the two first mentioned loop aerials to their respective sources of radio impulses and a line connecting said latter sources of radio impulses.

OSCAR A. BOCH.